United States Patent
Wu et al.

(10) Patent No.: US 7,653,405 B2
(45) Date of Patent: Jan. 26, 2010

(54) COMMUNICATING APPLICATION CONTROL AND DATA INFORMATION USING A TRAFFIC FLOW OVER A WIRELESS LINK

(75) Inventors: Geng Wu, Plano, TX (US); Chung-Ching Wang, Plano, TX (US); Ke-Chi Jang, Plano, TX (US); Jun Li, Plano, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 780 days.

(21) Appl. No.: 11/004,347

(22) Filed: Dec. 3, 2004

(65) Prior Publication Data

US 2005/0122922 A1    Jun. 9, 2005

Related U.S. Application Data

(60) Provisional application No. 60/527,674, filed on Dec. 8, 2003, provisional application No. 60/527,526, filed on Dec. 5, 2003.

(51) Int. Cl.
*H04B 7/00* (2006.01)
(52) U.S. Cl. .................... 455/519; 455/518
(58) Field of Classification Search .......... 455/517–521
See application file for complete search history.

(56) References Cited

U.S. PATENT DOCUMENTS 6,804,219 B2 *  10/2004  Koo et al. .................. 370/335

| | | | |
|---|---|---|---|
| 2002/0090965 A1 * | 7/2002 | Chen et al. | 455/522 |
| 2002/0097701 A1 * | 7/2002 | Lupien et al. | 370/338 |
| 2002/0181423 A1 * | 12/2002 | Chen et al. | 370/337 |
| 2003/0157945 A1 * | 8/2003 | Chen et al. | 455/458 |
| 2004/0008632 A1 * | 1/2004 | Hsu et al. | 370/252 |
| 2004/0196826 A1 * | 10/2004 | Bao et al. | 370/352 |

OTHER PUBLICATIONS

U.S. Appl. No. 10/913,664, filed Aug. 6, 2004, Lohtia et al.
U.S. Appl. No. 10/947,656, filed Sep. 22, 2004, Lohtia et al.
J. Postel, Request for Comments 791, "Internet Protocol," Sep. 1981, pp. 1-45.
W. Simpson, Request for Comments 1661, "The Point-to-Point Protocol (PPP)," Jul. 1994, pp. 1-52.
S. Deering and R. Hinden, Request for Comments 2460, "Internet Protocol, Version 6 (IPv6)," Dec. 1998, pp. 1-39.
"IP Multimedia Subsystem (IMS) Service Architecture," Jun. 2004, pp. 1-11.
M. Handley et al., Request for Comments 2543, "SIP: Session Initiation Protocol," Mar. 1999, pp. 1-153.

(Continued)

*Primary Examiner*—Raymond S Dean
(74) *Attorney, Agent, or Firm*—Trop, Pruner & Hu, P.C.

(57) ABSTRACT

To communicate information relating to an application over a wireless link, application control information and application data information are communicated over the wireless link between a mobile station and a base station system. The application data information is communicated over a traffic flow over the wireless link, and the application control information is communicated in a wireless control message carried in wireless signaling associated with the traffic flow.

29 Claims, 3 Drawing Sheets

OTHER PUBLICATIONS

3rd Generation Partnership Project 2 "3GPP2," "Introduction to cdma2000 Standards for Spread Spectrum System, Release A," Jun. 9, 2000, pp. 1-16.

UE Provisioniing V2.0.7, "Push-to-talk over Cellular (PoC); UE Provisioning; PoC Release 2.0;" Jun. 2004, pp. 1-13.

Architecture V2.0.8, "Push-to-talk over Cellular (PoC); Architecture; PoC Release 2.0," Jun. 2004, pp. 1-49.

Architecture V1.1.0, "Push-to-talk over Cellular (PoC); Architecture; PoC Release 1.0," Aug. 2003, pp. 1-23.

Presence Service V2.0.9, "Push-to-talk over Cellular (PoC); Presence Service; PoC Release 2.0," Jun. 2004, pp. 1-37.

Signaling Flows (NNI) V 2.0.7, Push-to-talk over Cellular (PoC); Signaling Flows—Network to Network Interface (NNI); PoC Release 2.0; Jun. 2004, pp. 1-135.

Transport Protocols V2.0.6, "Push-to-talk over Cellular (PoC) User Plane; Transport Protocols; PoC Release 2.0," Jun. 2004, pp. 1-39.

(E)GPRS/UMTS Specification V2.0.4, "Push-to-talk over Cellular (PoC) User Plane; (E)GPRS/UMTS Specification; PoC Release 2.0," Jun. 2004, pp. 1-15.

User Requirements V2.0.6, "Push-to-talk over Cellular (PoC); User Requirements; PoC Release 2.0," Jun. 2004, pp. 1-29.

TIA/EIA Interim Standard, Data Services Options for Spread Spectrum Systems—Radio Link Protocol Type 3, Addendum No. 1, Dec. 1999, pp. 1-146.

\* cited by examiner

COMMUNICATING APPLICATION CONTROL AND DATA INFORMATION USING A TRAFFIC FLOW OVER A WIRELESS LINK

CROSS-REFERENCE TO RELATED APPLICATIONS

This application claims the benefit under 35 U.S.C. § 119 (e) of U.S. Provisional Application Ser. No. 60/527,674, entitled "CDMA PTT Solutions," filed Dec. 8, 2003; and of U.S. Provisional Application Ser. No. 60/527,526, entitled "Methods for Reliable Transmission of Press (Push) To Talk (PTT) Floor Control and Other PTT Signaling Information By Transmitting Information BLOB Using Over The Air Signaling Message," filed Dec. 5, 2003, both hereby incorporated by reference.

TECHNICAL FIELD

The invention relates generally to communicating application control and data information in a traffic flow over a wireless link.

BACKGROUND

A mobile communications network is typically made up of a plurality of cells. Each cell includes a radio base station, with each base station connected to a mobile switching center or a packet service node that manages communications sessions between mobile stations and terminals coupled to a public switched telephone network (PSTN) or a packet-based data network. Communications between mobile stations and base stations are performed over wireless links.

Traditional wireless protocols provide for circuit-switched communications. Such protocols include time-division multiple access (TDMA) protocols and code-division multiple access (CDMA) protocols. In a circuit-switched network, a channel portion between two endpoints (e.g., two mobile stations) is occupied for the duration of the connection between the endpoints.

With the wide availability of the Internet and intranets, packet-switched communications (e.g., web browsing, electronic mail, and so forth) have become more common. Generally, a circuit-switched connection is an inefficient mechanism for communicating packet data. As a result, third generation (3G) and beyond wireless technologies are being developed and implemented to provide higher bandwidth and more efficient packet-switched communications (of data as well as voice and other forms of real-time data) over wireless networks.

One example of a packet-switched wireless technology is defined by the CDMA2000 family of standards, developed by the Third Generation Partnership Project 2 (3GPP2). A CDMA2000 wireless communications network is capable of supporting both circuit-switched services and packet-switched services. For TDMA, packet-switched wireless communications protocols have also been developed, such as the Enhanced General Packet Radio Service (EGPRS) protocol as defined by the 3GPP (Third Generation Partnership Project) UMTS (Universal Mobile Telecommunications System) Release 1999 Standard, and others.

A popular technique of communicating voice in packet-switched communications is referred to as voice-over-Internet Protocol (IP). In voice-over-IP, voice (and other forms of real-time data) is carried in IP packets in an IP session established between two or more network devices. With advancements in packet-switched wireless technologies, voice-over-IP over packet-switched wireless networks have also been implemented.

A more recent advancement is the proposal of press (push)-to-talk (PTT) over voice-over-IP in a wireless network. This technology is based on PTT over cellular (PoC) technology, which enables real-time one-to-one or one-to-many voice communications service over a wireless network that is started by pressing or pushing a talk key or button on a mobile station. PTT enables multiple users to communicate with each other, where one party (the caller) has control and right-to-speak at any one time. To acquire the right-to-speak, the caller sends a request (referred to as a floor control request) to a PTT server, where the request is sent in response to pushing of the talk key or button on a mobile station.

Data service applications, such as PTT applications or other types of data service applications, are associated with both control and data traffic. Traditionally, two traffic flows over the wireless link between a mobile station and a base station system are established for separately carrying the application control information and application data information (e.g., voice). Different service options are used for the two traffic flows. For example, in a CDMA2000 wireless network, the traffic flow for carrying application control information uses a service option (e.g., service option 33 or SO-33) with the Radio Link Protocol (RLP) enabled. RLP provides a reliability mechanism to assure retransmission of lost application control information in the traffic flow over the wireless link, which can be lost due to poor wireless conditions. On the other hand, the traffic flow for carrying application data, such as voice, is associated with another service option (e.g., SO-60) in which RLP (and its associated reliability mechanism) is disabled.

Typically, it is not desirable to retransmit lost voice data, since vocoders (voice encoders/decoders) are able to conceal error (by replaying previously received good voice frames). Any reliability mechanism defined for retransmitting voice traffic would increase the delay for transmitting voice over the wireless link. However, an issue associated with using multiple traffic flows over the wireless link for separately carrying application control information and application data information is inefficiency in allocation of resources of the wireless link.

In some other wireless systems, a single traffic flow, with RLP enabled, has been used to carry both application control and data information. However, the provision of RLP for carrying real-time application data information is inefficient due to the increased delay and the increased delay variation, which have negative effects on the quality of service.

SUMMARY

In general, methods and apparatus are provided to communicate application control information and application data information in a traffic flow over a wireless link between a mobile station and a base station.

Other or alternative features will become apparent from the following description, from the drawings, and from the claims.

DETAILED DESCRIPTION

In the following description, numerous details are set forth to provide an understanding of some embodiments. However, it will be understood by those skilled in the art that some embodiments may be practiced without these details and that numerous variations or modifications from the described embodiments may be possible.

Figure 1:
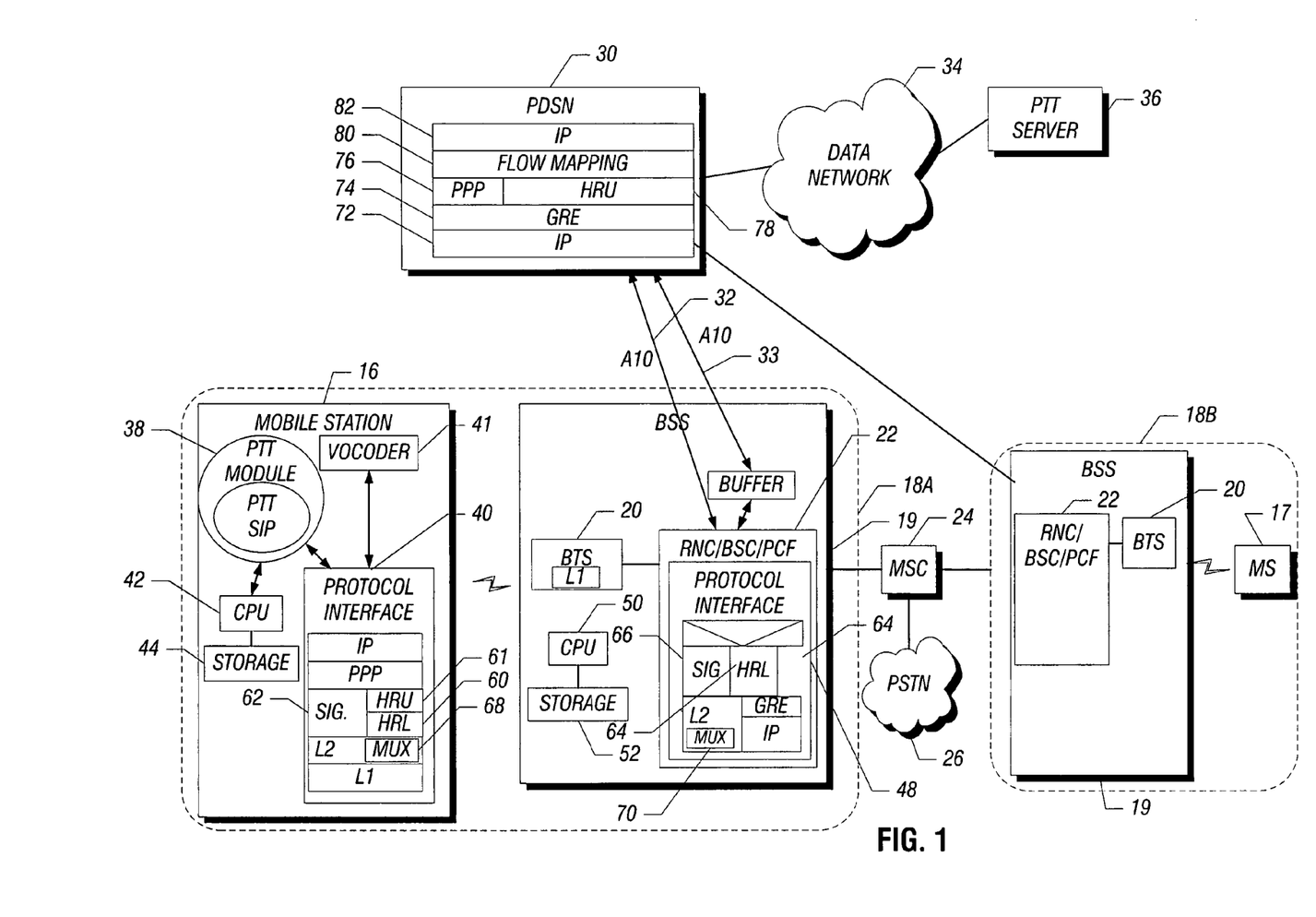
FIG. 1 is a block diagram of an example communications network that incorporates mechanisms according to an embodiment.

Referring to FIG. 1, an example communications network includes a wireless or mobile communications network that is coupled to a packet data network 34 (such as a local area network (LAN), wide area network (WAN), Internet, and so forth). According to an embodiment, the wireless communications network includes components that operate according to CDMA (code-division multiple access) 2000. CDMA2000 is defined by the CDMA2000 family of standards (including the TIA-2000 standards, TIA-2001 standards, and the TIA-835 standards). However, in other embodiments, other types of wireless protocols can be used for communications in the wireless communications network, including other versions of CDMA, TDMA (time-division multiple access) protocols, UMTS (Universal Mobile Telecommunications System) protocols, and other wireless protocols.

The wireless communications network includes multiple cells or cell segments 18 (18A, 18B shown), each including a base transceiver subsystem (BTS) 20 for performing radio telecommunications with mobile stations within the coverage area of the respective cell 18. A "cell segment" refers to either a cell or cell sector. The BTS entities 20 are connected to one or more base station controllers (BSCs) or radio network controllers (RNCs). A CDMA2000 system also includes a packet control function (PCF), which manages the relay of packets with a packet data serving node (PDSN) 30. In one embodiment, the RNC/BSC and PCF are depicted as being part of a single platform: RNC/BSC/PCF 22. Although depicted as being part of the same platform, the BSC/RNC and PCF can be on separate platforms in another implementation.

A "platform" generally refers to an assembly of hardware and software that provides predefined tasks. The terms "BSC" (base station system) and "RNC" (radio network controller) are used interchangeably. Collectively, a BTS 20 and BSC/PCF 22 are referred to as a "base station system" 19. More generally, a "base station system" refers to any entity (or collection of entities) that communicates wirelessly with mobile stations and that exchanges control signaling with the mobile stations for establishing, terminating, or otherwise managing communication sessions (e.g., circuit-switched call sessions, packet-switched voice call sessions, other packet-switched communications sessions, and so forth). Note that, in some implementations, multiple BTSs can be connected to each BSC.

For communicating circuit-switched voice traffic, the base station system 19 is coupled to a mobile switching center (MSC) 24, which is responsible for switching mobile station-originated or mobile station-terminated circuit-switched traffic. Effectively, the MSC 24 is the interface for signaling and user traffic between the wireless network and other circuit-switched networks (such as a public switched telephone network (PSTN) 26 or other MSCs). The PSTN 26 is connected to landline terminals (not shown).

The wireless communications network also supports packet data services, in which packet data is communicated between a mobile station and another endpoint, which can be a terminal coupled to the packet data network 34 or another mobile station that is capable of communicating packet data. Packet data is communicated in a packet-switched communications session established between the mobile station and the other endpoint through the PDSN 30.

The PDSN 30 establishes, maintains, and terminates link layer sessions to mobile stations, and routes mobile station-originated or mobile station-terminated packet data traffic. The PDSN 30 is coupled to the packet data network 34, which is connected to various endpoints, such as computers and network telephones (not shown) (a network telephone is a telephone that is fitted with a network interface card for communications over packet data networks). Examples of packet-switched communications include web browsing, electronic mail, text chat sessions, file transfers, interactive game sessions, voice-over-IP sessions, and so forth.

The wireless communications network thus provides two different types of communications: circuit-switched communications and packet-switched communications. Circuit-switched communications are routed through the MSC 24, while packet-switched communications are routed through the PDSN 30. In circuit-switched communications, a dedicated end-to-end channel is established for the duration of a call session. However, packet-switched communications utilize a connectionless intranetwork layer, such as that defined by the Internet Protocol (IP). One version of IP, referred to as IPv4, is described in Request for Comments (RFC) 791, entitled "Internet Protocol," dated September 1981; and another version of IP, referred to as IPv6, is described in RFC 2460, "Internet Protocol, Version 6 (IPv6) Specification," dated December 1998. In packet-switched communications, packets or other units of data carry routing information (in the form of network addresses) that are used to route the packets or data units over one or more paths to a destination endpoint.

The communications network depicted in FIG. 1 enables press (push)-to-talk (PTT) communications sessions. The terms "press-to-talk" and "push-to-talk" are used interchangeably. A "PTT communications session" or "PTT session" refers to a communications session in which one user (the caller) is able to establish real-time, one-to-one or one-to-many voice communications (and/or other real-time communications such as video, or video and voice) by simply pressing a talk button or key on a mobile station. In response to activation of the talk button or key during a PTT session, a request is sent to a PTT server 36 that is coupled to the data network 34. The request sent by the mobile station in response to activation of the talk button or key is a floor control request that seeks the right or ability to talk in the PTT session.

Note that a PTT session involving two or more users is initially established by the use of call control signaling, such as Session Initiation Protocol (SIP) signaling or another type of call control signaling. SIP is described in RFC 2543, entitled "The Session Initiation Protocol (SIP) Specification," dated March 1999. SIP defines control signaling for establishing multimedia sessions over packet-switched networks. Once the PTT session is established, any of the users involved can seek the right or ability to talk by activating the talk button or key on a respective PTT-enabled mobile station or other terminal. Note that a PTT endpoint (that is involved in a PTT session) can be any terminal, including wired (landline) terminals or wireless terminals.

The term "right-to-talk" or "ability-to-talk" refers to a particular terminal (such as a mobile station) acquiring a token or other indication that the terminal is now able to transmit voice or other forms of real-time data to other terminal(s) involved in the PTT session.

As further shown in FIG. 1, the mobile station 16 includes a PTT module 38 that manages communications for PTT sessions established between the mobile station 16 and one or more other terminals, such as mobile station 17 or any other terminal coupled to the packet data network 34, PSTN 26, MSC 24, or another PDSN. Alternatively, the PTT module 38 can be another type of data service application software, such as standard voice-over-IP software, text chat or instant message software, and others. The term "data service application software" refers to any software for performing communications over a packet-switched network, such as an IP network.

The PTT module 38 (or other data service application) is coupled to a protocol interface 40, which includes various layers, including a level 1 (L1) layer, level 2 (L2) layer, and higher level layers (e.g., a Point-to-Point or PPP layer and an IP layer). PPP, which provides a standard method for transporting multi-protocol packets over point-to-point links, is described in RFC 1661, entitled "The Point-to-Point Protocol (PPP)," dated July 1994. The protocol interface 40 also includes a header removal lower (HRL) layer 60, a header removal upper (HRU) layer 61, and a signaling layer 62 (described further below).

In accordance with some embodiments, efficient techniques are employed for communicating application control information and application data information associated with the PTT module 38 or other data service application software. "Application data information" refers to the actual bearer data, such as voice, video, text or other data associated with a particular application. "Application control information" refers to control messages that are used for establishing, maintaining, terminating, or otherwise controlling a session in which application data information is exchanged between two or more endpoints over a network.

According to some embodiments, a single traffic flow is defined between the mobile station 16 and base station system 19 for carrying both the application control information and application data information. In one embodiment, the reliability mechanism provided by a Radio Link Protocol (RLP) is disabled for the traffic flow. Disabling RLP provides for real-time delivery over the wireless link between the mobile station 16 and base station system 19 since lost application data information (e.g., voice) is not retransmitted. Due to the relatively large amount of application data information that is typically exchanged between endpoints, retransmitting application data information would be wasteful of the bandwidth of the wireless link between the mobile station and base station system for real-time applications.

However, with RLP disabled, the single traffic flow is not a reliable mechanism for carrying application control information. In accordance with some embodiments, a "hidden" flow associated with the traffic flow is used for carrying the application control information. This hidden flow is actually the wireless signaling that can be communicated in a multiplexed fashion with the actual traffic flow on an underlying physical channel (such as a fundamental channel (FCH) in a CDMA2000 1×RTT system) between the mobile station and base station system. The wireless signaling for carrying the application control information includes various types of wireless control messages, such as L2 messages or L3 messages, that are exchanged over the wireless link. Specific portions of such wireless messages are allocated for carrying the application control information.

The L2 or L3 wireless messages are sent across the wireless link in assured mode such that assurance is provided that a wireless message has been successfully received at the receiver over the wireless link. The assured mode for communicating wireless messages is accomplished by providing acknowledgments from the receiver to the sender. In some embodiments, the acknowledgment is an L2 acknowledgment. Since the acknowledge mechanism for providing assured mode is already part of the wireless signaling communicated between the mobile station and base station system, extra overhead associated with providing a reliability mechanism for application control information can be avoided.

For communicating signaling over the wireless link between the mobile station and base station system, the protocol interface 40 includes the signaling layer 62 (e.g., a CDMA2000 1×RTT signaling layer). The signaling layer 62 generates wireless signaling (in the form of wireless messages) communicated over the wireless link. For user traffic, the protocol interface 40 also includes the header removal upper (HRU) layer 61 to remove headers of outbound packets carrying user traffic. Removing headers, such as IP headers, UDP (User Datagram Protocol) headers, and RTP (Real-Time Protocol) headers, reduces the sizes of packets sent over the wireless link to reduce consumption of bandwidth of the wireless link. The headers are re-assembled at the receiving end. The protocol interface 40 also includes a header removal lower (HRL) layer 60 that is responsible for delimiting the packets (without headers) so that the packets can be re-assembled at the receiving end.

The PTT module 38 and at least portions of the protocol interface 40 are implemented in software that can be executed on a central processing unit (CPU) 42 in the mobile station 16. The CPU 42 is connected to a storage 44. The mobile station 16 also includes a talk button or key (not shown) that when activated indicates that a user desires to acquire the right to talk in a PTT session.

In the base station system 19, the BTS 20 and BSC/PCF 22 include a protocol interface 48 for communicating with the protocol interface 40 of the mobile station 16. To communicate on the air interface side, the protocol interface 48 includes a level 1 (L1) layer implemented in the BTS 20, and a level 2 (L2) layer in the BSC/PCF 22. The protocol interface 48 also includes a signaling layer 66 (e.g., CDMA signaling layer) and an HRL layer 64 that corresponds to the HRL layer 60 in the mobile station.

To communicate with the PDSN 30, the protocol interface 48 includes an IP layer and a Generic Routing Encapsulation (GRE) layer. A version of GRE is described in RFC 2784, entitled "Generic Routing Encapsulation (GRE)," dated March 2000. GRE specifies a protocol for encapsulation of an arbitrary network layer protocol over another arbitrary network layer protocol. At least a portion of the protocol interface 48 is executable on a CPU 50 in the base station system 19, which is connected to a storage 52.

The L1 layer of the protocol interface in each of the mobile station and base station system is the physical layer that provides for the transmission and reception of radio signals between the base station system and the mobile station.

The L2 layer provides for delivery of signaling messages generated by higher layers. The L2 layer includes two sublayers, the link access control (LAC) sublayer and the medium access control (MAC) sublayer. The LAC sublayer is the upper sublayer of the L2 layer, and implements a data link protocol that provides for the correct transport and delivery of signaling messages generated by higher layers. The MAC sublayer is the lower sublayer of the L2 layer, and implements the medium access protocol and is responsible for transport of LAC protocol data units using services provided by the L1 layer.

The L2 layer includes a multiplex sublayer 68 (in the mobile station 16) or 70 (in the BSC/PCF 22) for multiplexing wireless signaling and user traffic frames onto a physical traffic channel, such as a fundamental channel. A further description of the various layers of a protocol interface is provided by the CDMA2000 1×RTT specification.

Although example layers of protocol interfaces are described with respect to the example implementation, it is contemplated that other embodiments can use other types of protocol interfaces.

The mobile station 17 and BSC/PCF 22 in the cell segment 18B contain similar components as the mobile station 16 and BSC/PCF 22, respectively, in the cell segment 18A.

The PDSN 30 includes the following layers: a first IP layer 72, a GRE layer 74, a PPP layer 76, an HRU layer 78 (corresponding to the HRU layer 61 in the mobile station), a flow mapping layer 80, and a second IP layer 82. The flow mapping layer 80 is used to map application control and data information to A10 connections 32, 33 established between the PCF and PDSN. An A10 connection is used for carrying user traffic between the PCF and PDSN. Application information, such as PTT application information, is carried in a pair of A10 connections (32, 33). One A10 connection 32 is used to carry application control information, while the other A10 connection is used to carry application data information.

Figure 2:
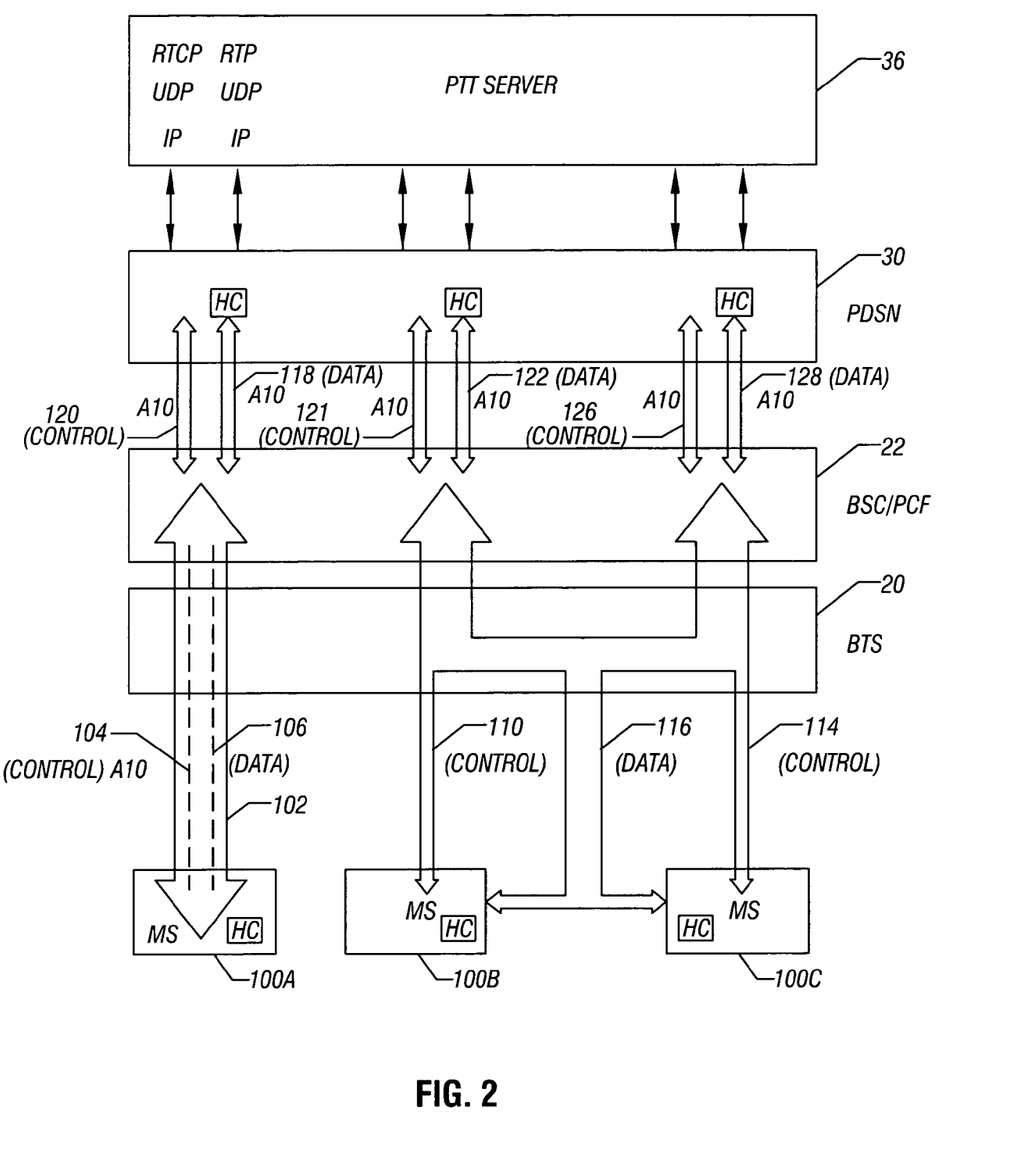
FIG. 2 is a block diagram of traffic flows used to carry application control and data information, in accordance with an embodiment.

FIG. 2 illustrates communications paths between mobile stations 100A, 100B, 100C, and the PTT server 36 through the BTS 20, BSC/PCF 22, and PDSN 30. Each of the mobile stations 100A, 100B, 100C are configured similarly to mobile station 16 of FIG. 1. A single traffic flow 102 is defined between the mobile station 100A and the BSC/PCF 22 for carrying both application control information 104 and application data information 106. The single traffic flow 102 is associated with the SO-PTT service option, which indicates that only one traffic flow has to be allocated for communicating both application control and data information.

Optionally, at least some of the mobile stations 100A, 100B, 100C are capable of dual-mode operation in which the mobile station can either use the SO-PTT service option or the SO-33 service option for communicating application control information. Note that use of the SO-33 service option means that a first traffic flow (with RLP turned on) is used for communicating application control information, while service option 60 (SO-60) defines a second traffic flow (with RLP turned off) for carrying application data information. The dual-mode ability of a mobile station enables the mobile station to function properly in different wireless networks (where some wireless networks provides for the SO-PTT service option, whereas other wireless networks provide for the SO-33 and SO-60 service options but not the SO-PTT service options).

Between the PCF and PDSN, the BSC/PCF 22 routes the application control information 104 over A10 connection 120 and routes the application data information 106 over A10 connection 118. Note that header compression is applied at the PDSN 30 and mobile station 100A (indicated by the "HC" blocks). One implementation of header compression is header removal as performed by the HRU layers 61 and 78 of FIG. 1. In other implementations, other types of header compression can be applied. Header compression is applied to the application data information carried over A10 connection 118.

The PDSN 30 in turn communicates the application control and application data information with the PTT server 36. Note that, in one implementation, the application control information is communicated in RTCP (Real-Time Control Protocol)/UDP/IP packets, while the application data information is carried in RTP (Real-Time Protocol)/UDP/IP packets.

Application control data information can similarly be carried in respective single traffic flows between the mobile stations 100B, 100C and the BSC/PCF 22. The application control and data information of the mobile stations 100B, 100C can be communicated over respective pairs of A10 connections 121, 122 and 126, 128 between the BSC/PCF 22 and the PDSN 30.

The single traffic flow defined to carry information associated with a PTT application or other type of data service application between a mobile station and the base station system enables more efficient use of wireless link resources. A "traffic flow" is basically a logical traffic channel of the wireless link for carrying application information. Application information includes both application control information and application data information. In one example, the application control information of a PTT application includes such messages as floor control requests (to request the right to talk in a PTT session), a floor control grant (to indicate that a user has been granted the right to talk), and so forth. The application data information for a PTT application refers to the voice.

Use of a single traffic flow for carrying both application control information and application data information according to some embodiments is contrasted to conventional mechanisms that employ separate traffic flows for separately carrying the application control information and the application data information. With the dual-traffic flow technique, a traffic flow with a reliability mechanism (such as that associated with the RLP) is used for carrying the application control information. RLP enables re-transmission of the application control information in case signaling is lost over the wireless link. On the other hand, according to the conventional technique, RLP is disabled for the traffic flow carrying the application data information such that re-transmission of lost application data frames is not performed over the wireless link. The use of two traffic flows for separately carrying application control information and application data information is inefficient.

As noted above, reliably communicating application control information and application data information in a single traffic flow is accomplished by using a hidden flow associated with the single traffic flow for carrying application control information. The single traffic flow is defined without a reliability mechanism provided by RLP. A traffic flow with no RLP can efficiently carry application data information, such as voice, where it is usually undesirable to re-transmit lost voice frames. The hidden flow of the single traffic flow includes wireless messaging carried in wireless signaling over the wireless link.

The wireless messaging (L2 or L3 wireless messaging) carrying the application control information can be multiplexed (such as by the multiplex sublayer 68 and 70 of FIG. 1) with the traffic flow carrying the application data information onto a physical wireless channel, such as a fundamental channel. A characteristic of the fundamental channel associated with CDMA2000 1×RTT is that user traffic and CDMA2000 1×RTT signaling can be multiplexed onto the fundamental channel. The multiplexing of CDMA2000 1×RTT signaling with user traffic allows the base station system and mobile station to quickly and efficiently control various aspects of the wireless communications between the base station system and mobile station. In a different embodiment, a different traffic channel, such as the supplemental channel, can be used to carry traffic flows for PTT or other data service sessions.

According to one embodiment, the hidden flow for carrying the application control information, in the form of CDMA2000 1×RTT signaling, provides for the communication of wireless messages each defined to carry a specially defined block of bits (BLOB). The BLOB contains the application control information associated with a data service application. In one example implementation, the BLOB carried in the wireless messaging is referred to as a "PTT BLOB" for carrying PTT control information, such as a PTT floor control request or a PTT floor control grant.

In response to wireless messages carrying BLOBs containing application control information, the receiving peer (mobile station or base station) transmits an L2 acknowledgment (or other type of acknowledgment of the wireless message) to the transmitting peer to provide assurance that the application control information has been reliably received over the wireless link.

The wireless control message for carrying application control information in the hidden flow can be any one of various different types of layer 2 or layer 3 control messages. For example, the wireless control message can be a pre-existing message such as the Service Option Control Message (SOCM), with an additional information element defined to store the PTT BLOB. Alternatively, the wireless control message can be a new signaling message for carrying the PTT BLOB. One such new signaling message is referred to as the Signaling BLOB Message (SIGBM). An example format of the SIGBM message is as follows:

| Field | Length (bits) |
|---|---|
| SR_ID | 4 |
| CON_REF | 8 |
| SERVICE_OPTION | 16 |
| PTT_INC | 1 |
| PTT_PURPOSE | 0 or 4 |
| BLOB_INC | 1 |
| BLOB_TYPE | 0 or 3 |
| BLOB_LEN | 0 or 8 |
| Type-specific fields | 0 or 8 × BLOB_LEN |
| RESERVED | 0-7 |

The SR_ID field is the service reference identifier for identifying a particular flow between the mobile station and the base station system. The CON_REF field is a service option connection reference, and the SERVICE_OPTION field specifies the service option. For example, as discussed above, the SERVICE_OPTION field can specify SO-PTT, which is an identifier of a service option for a PTT session.

The PTT_PURPOSE field indicates the purpose of the PTT information included in the message (such as a request for floor control). Thus, in this specific example, the PTT_PURPOSE field provides the Request information element carried in the WM message at 108. If PTT_PURPOSE is included, then the PTT_INC field is set to the value "1." The BLOB_INC field is set to the value "1" if the BLOB_TYPE, BLOB-LEN, and Type-specific fields are included in the message. Otherwise, the BLOB_INC field is set to the value "0." The BLOB_TYPE field identifies the type of the BLOB information. The BLOB_LEN field identifies the record length of the BLOB information. The Type-specific fields are set to values according to the requirements for the service option.

The SIGBM message format described above is for the reverse channel (from the mobile station to the base station system). The format for the SIGBM message carried in the forward channel (from base station system to mobile station) is as follows:

| Field | Length (bits) |
|---|---|
| USE_TIME | 1 |
| ACTION_TIME | 6 |
| SR_ID | 4 |
| CON_REF | 8 |
| SERVICE_OPTION | 16 |
| PTT_INC | 1 |
| PTT_PURPOSE | 0 or 4 |
| BLOB_INC | 1 |
| BLOB_TYPE | 0 or 3 |
| BLOB_LEN | 0 or 8 |
| Type-specific fields | 9 or 8 × BLOB_LEN |
| RESERVED | 0-7 |

According to this format, the USE_TIME field indicates whether the ACTION_TIME field specifies a time at which the SIGBM message is to take effect. The SIGBM message in the forward channel also contains the SR_ID, CON_REF, SERVICE_OPTION, PTT_PURPOSE, BLOB_INC, BLOB_TYPE, BLOB_LEN, and Type-specific fields.

The example wireless messages provided above are wireless control messages. In yet another embodiment, the wireless message can be a Data Burst message, with a predetermined burst type to identify the message as being associated with a PTT session. The Data Burst message can include SR_ID, CON_REF, and BLOB information. A special burst type value can be included in the data burst message to identify the data burst message as being associated with a PTT session.

Yet another possible wireless message (WM) is a layer 2 control message, such as a specially defined PTT Request message sent by the LAC sublayer of the mobile station. The layer 2 message can also carry the BLOB containing the floor control request and other PTT-related control information.

The content of the PTT BLOB can include the following, according to one embodiment: the SR_ID, the type of the BLOB (e.g., BLOB for PTT, BLOB for packet data service, and so forth), the purpose of the BLOB (PTT floor control request, PTT floor control grant, PTT floor control reject, PTT retry delay, and so forth), result codes (e.g., requested action successful, requested action failed, and so forth), an identifier of the PTT group (a PTT group is the group of users involved in a particular PTT session), information identifying active users of the group, information pertaining to the destination IP address and TCP (Transmission Control Protocol) or UDP (User Datagram Protocol) port information, source IP address and TCP or UDP port information, and upper layer signaling fields for the associated data application. In other embodiments, the content of the PTT BLOB can be different and can include other types of information.

The wireless message is sent by the mobile station to the base station system in assured mode. Assured mode is a mode of delivery defined by CDMA2000 that guarantees that a message is delivered to the peer. The message sent in assured mode is retransmitted by the LAC sublayer, up to some predetermined maximum number of retransmissions, until the LAC sublayer at the sender receives an acknowledgment for the message from the receiver. The expected acknowledgment is an L2 (LAC) acknowledgment.

The communication of a PTT BLOB between a mobile station and the PTT server is described in greater detail in U.S. patent application Ser. No. 11/004,497, entitled "CONTROLLING A PRESS-TO-TALK SESSION USING WIRELESS SIGNALING," filed Dec. 3, 2004, by KE-CHI JANG, CHUNG-CHING WANG, JUN LI, and GENG WU, which is hereby incorporated by reference.

According to further embodiments, as depicted in FIG. 2, for even more efficient usage of wireless link resources between the mobile station and base station systems, a shared forward traffic channel 116 can be used to communicate application data information to mobile stations that are part of the same PTT group (such as mobile stations 100A, 100B shown in FIG. 2). A "PTT group" refers to a group of users that are participating within a PTT session, such that any one of the users can talk to any other one or more users in the PTT group. A characteristic of users of a PTT group is that only one of them will be talking at any given time (the one that has been granted the right to talk), while the other PTT users are listening.

For example, the user of mobile station 100A can have the right-to-talk, while the users of the mobile stations 100B, 100C (100A-C are all part of the same PTT group) are listening. In this scenario, the mobile stations 100B, 100C are receiving the same application data information, namely the voice data from the originating mobile station 100A. One technique of communication of the voice data to the mobile stations 100B, 100C is to transmit the voice data in traffic flows mapped to separate dedicated forward traffic channels, such as separate forward supplemental channels (F-SCH) or separate forward fundamental channels (F-FCH). However, sending the same voice data over separate dedicated forward traffic channels is wasteful of radio resources. To enhance efficiency according to some embodiments, the voice data from the mobile station 100A can be transmitted over the shared forward channel 116 (a physical channel) to the mobile stations 100B, 100C. By sharing the forward channel 116 among the mobile stations 100B, 100C (and possibly among other mobile stations in the cell segment), the serving base station system would only need to assign one physical forward traffic channel for carrying voice data in the forward wireless link from the base station system to the mobile stations. Consequently, in a CDMA2000 1×RTT system, Walsh codes within each cell segment can be more efficiently used. In a CDMA system, a Walsh code (along with a long pseudorandom code and short pseudorandom code) defines a physical channel.

Note that the mobile stations 100B, 100C share the forward traffic channel 116 for the purpose of carrying application data information (e.g., voice). However, the application control information communicated in the forward wireless link to the mobile stations 100B, 100C is carried separately in wireless signaling 110, 114 (similar to wireless signaling 104 for mobile station 100A) associated with respective traffic flows.

Although sharing a forward traffic channel, such as a shared F-SCH, can generally improve efficiency in the usage of wireless link resources within a cell segment (e.g., a cell sector or cell), there may be scenarios where allocation of the shared F-SCH would lead to decreased efficiency. For example, users of a particular PTT group may be spread apart geographically such that they are located in different cell segments served by different base station systems. In such a scenario, allocation of the shared F-SCH would be wasted since no sharing of the F-SCH can actually occur due to the dispersed locations of the users of the PTT group.

In accordance with some embodiments of the invention, two modes of operation are identified for each mobile station for increased efficiency: normal mode and enterprise mode. A mobile station in normal mode is not allocated a shared F-SCH (or other shared traffic channel). Instead, the mobile station in normal mode is allocated a dedicated F-FCH (forward fundamental channel), or other forward traffic channel without allocating the shared F-SCH. Both control and data information can be communicated with the F-FCH. A mobile station is assigned to be in normal mode if the mobile station is free to call or receive a call from any other mobile station. A mobile station can also be assigned to be in normal mode if the network detects that the users of a particular PTT group are located in different cell segments, which would render the allocation of a shared traffic channel useless.

In enterprise mode, a mobile station is assigned at least two channels: a forward F-FCH or F-DCCH (forward dedicated control channel), and a shared F-SCH. The F-FCH or F-DCCH is used for carrying control information to the mobile station, whereas the shared F-SCH is used to carry data information.

Figure 3:
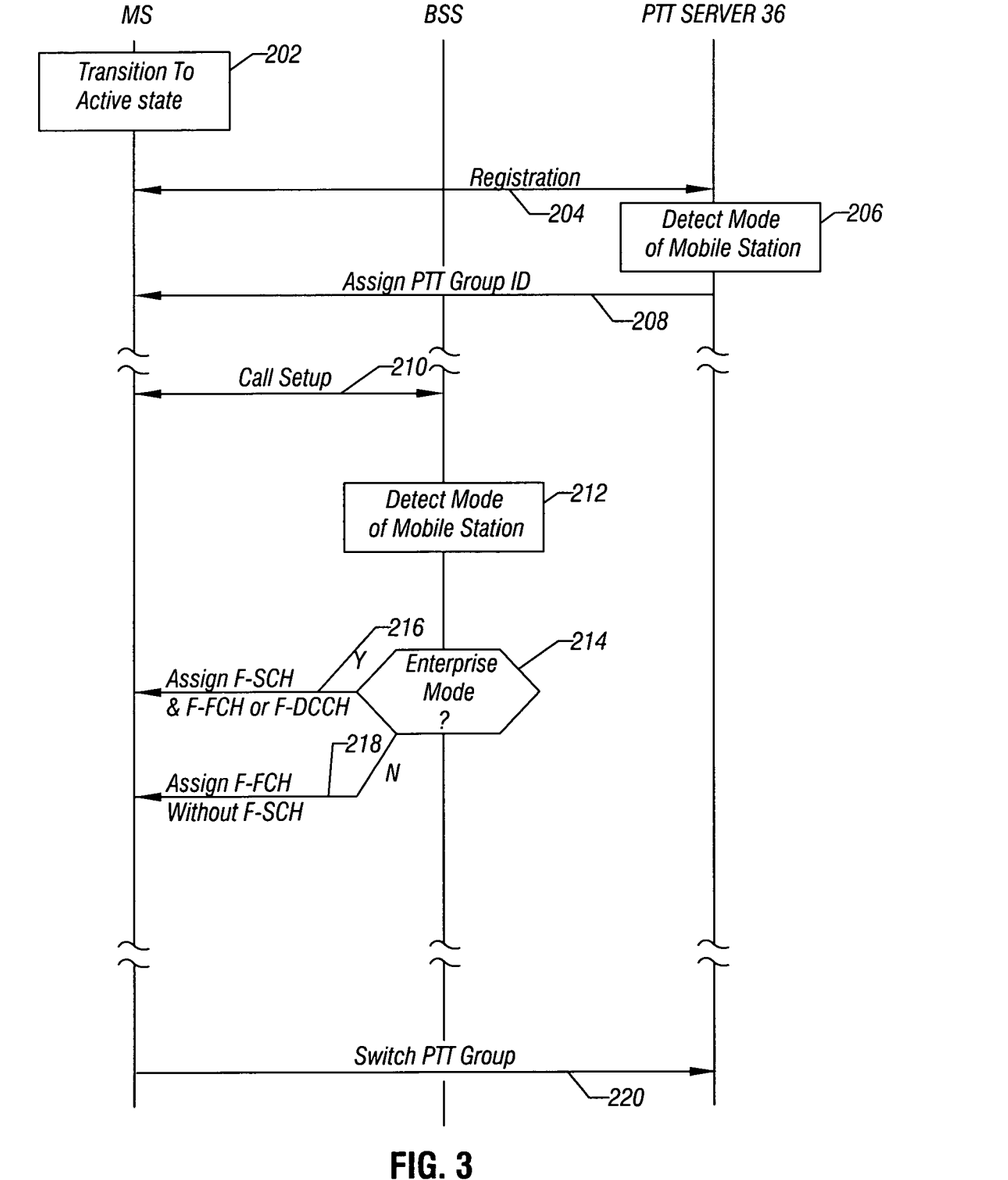
FIG. 3 is message flow diagram for setting up a mobile station in enterprise mode, according to another embodiment.

A message flow for determining a mode of the mobile station and assigning traffic channels based on the mode is depicted in FIG. 3. A mobile station transitions (at 202) to an active state, which can occur as a result of the mobile station powering up in a wireless network. In addition to initialization procedures in the wireless network (not shown), the mobile station also performs (at 204) a registration procedure with the PTT server 36. As part of the registration procedure, the PTT server 36 determines (at 206), based on predetermined criteria, whether the mobile station should be in normal mode or enterprise mode. Criteria considered by the PTT server 36 includes the size of the PTT group the mobile station is part of, the geographic proximity of mobile stations in the same PTT group (e.g., whether there are greater than a certain number of PTT users in a given cell segment), and other criteria. A PTT group should have a number of members (mobile stations) greater than a predetermined number to qualify for enterprise mode.

The PTT server 36 next assigns (at 208) a PTT group identifier (PTT Group ID) to the mobile station. The PTT Group ID can be associated with a mode indicator set to one of two states to indicate whether the mobile station is to be in enterprise mode or normal mode, based on the determination at 206 by the PTT server 36. The PTT Group ID (and the associated mode indicator) is stored in the mobile station.

The PTT Group ID can be a temporary group ID or a permanent group ID. For example, a user can select which PTT group the user wishes to be temporarily part of. Also, the PTT group itself can be a temporary group. In these scenarios, the PTT server 36 assigns a temporary group ID.

Note that the PTT server 36 can perform tasks 206 and 208 in response to other events after initialization of the mobile station. For example, a mobile station can send a presence update request to the PTT server 36 to update either its PTT Group ID or its mode.

The mobile station next performs (at 210) a call setup procedure with the base station system. In response to the call setup, the base station system detects (at 212) the mode (normal mode or enterprise mode) of the mobile station. In response to determining (at 214) that the mobile station is in enterprise mode, the base station system assigns (at 216) an F-FCH or F-DCCH and a shared F-SCH to the mobile station. However, in response to determining (at 214) that the mobile station is in normal mode, the base station system assigns (at 218) an F-FCH without assigning a shared F-SCH.

Subsequently, the mobile station can send a request (at 220) to switch PTT group. For example, the user of the mobile station may be listening in on conversations of a first PTT group. Later, the user may decide to listen in on conversations of a second PTT group. The switching is accomplished by sending a switch control message to the PTT server 36. The switch control message can be carried in a PTT BLOB communicated from the mobile station through the base station system to the PTT server 36. In response to the switch control message, the PTT server 36 can perform acts similar to acts 206 and 208 to determine the mode of the mobile station and to assign a new PTT Group ID.

Instructions of the various software modules discussed herein are loaded for execution on corresponding control units or processors, such as a CPU 42 or 50 (FIG. 1). Processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software are loaded or transported to each entity in one of many different ways. For example, code segments including instructions stored on floppy disks, CD or DVD media, a hard disk, or transported through a network interface card, modem, or other interface device are loaded into the entity and executed as corresponding software routines or modules. In the loading or transport process, data signals that are embodied in carrier waves (transmitted over telephone lines, network lines, wireless links, cables, and the like) communicate the code segments, including instructions, to the entity. Such carrier waves are in the form of electrical, optical, acoustical, electromagnetic, or other types of signals.

While some embodiments have been disclosed with respect to a limited number of embodiments, those skilled in the art will appreciate numerous modifications and variations there from. It is intended that the appended claims cover such modifications and variations as fall within the true spirit and scope of some embodiments.

What is claimed is:

1. A method of communicating information relating to an application over a wireless link, comprising:
    communicating application control information relating to the application and application data information relating to the application in a single traffic flow over the wireless link between a mobile station and base station system, the traffic flow being without a Radio Link Protocol (RLP) reliability mechanism,
    wherein communicating the application control information and application data information in the traffic flow comprises:
        communicating the application control information in a wireless control message carried in wireless signaling associated with the traffic flow, wherein the wireless control message is sent in an assured mode in which assurance is provided that the wireless control message has been successfully delivered.

2. The method of claim 1, further comprising using a wireless signaling acknowledgment procedure to provide reliable communication of the application control information over the wireless link, wherein the wireless signaling acknowledgment procedure is part of the assured mode.

3. The method of claim 1, further comprising assigning the single traffic flow to communicate the application control information and application data information.

4. The method of claim 3, wherein assigning the single traffic flow comprises assigning the single traffic flow with the Radio Link Protocol (RLP) reliability mechanism off.

5. The method of claim 3, wherein communicating the application control information and application data information comprises communicating press-to-talk application control information and press-to-talk application data information using the single traffic flow.

6. The method of claim 1, further comprising multiplexing the application data information and the wireless signaling carrying the application control information onto a physical traffic channel of the wireless link.

7. The method of claim 6, wherein the application data information and the wireless signaling carrying the application control information are multiplexed onto a fundamental channel of a code-division multiple access (CDMA) wireless network.

8. The method of claim 1, further comprising using a wireless signaling acknowledgment procedure that is part of the assured mode to provide reliable communication of the application control information over the wireless link, wherein the wireless signaling acknowledgment procedure comprises using a layer 2 acknowledgment of the wireless signaling carrying the application control information.

9. The method of claim 1, wherein the application control information is carried in one of a layer 2 and layer 3 wireless control message.

10. The method of claim 1, further comprising communicating the application control information and application data information over two A10 connections between the base station system and a packet data service node.

11. The method of claim 1, further comprising removing protocol headers from packets carrying the application data information before communicating the packets over the traffic flow.

12. The method of claim 1, further comprising communicating voice data that is part of the application data information over a shared physical traffic channel to plural mobile stations, the voice data from one originating mobile station.

13. The method of claim 12, wherein communicating the voice data that is part of the application data information over the shared physical traffic channel to plural mobile stations comprises communicating the voice data over a shared forward supplemental channel.

14. The method of claim 1, further comprising communicating voice data that is part of the application data information over plural dedicated physical traffic channels to plural respective mobile stations, the voice data from one originating mobile station.

15. The method of claim 1, wherein the mobile station comprises a first mobile station that is assignable to be in a first mode or second mode, the method further comprising:
    assigning a shared forward supplemental channel and one of a forward fundamental channel and forward dedicated control channel to the first mobile station in response to detecting the first mobile station in the first mode, the shared forward supplemental channel used to carry voice data from an originating mobile station to the first mobile station and at least another mobile station;
    assigning a forward fundamental channel without assigning the shared forward supplemental channel to the first mobile station in response to detecting the first mobile station in the second mode.

16. An article comprising at least one storage medium containing instructions that when executed cause a system to:
communicate application control information related to a voice-over-Internet Protocol (IP) application and application data information related to the voice-over-IP application in a single traffic flow over the wireless link between a mobile station and base station system, wherein the single traffic flow is without a Radio Link Protocol (RLP) reliability mechanism; and
use a wireless signaling acknowledgment procedure to provide reliable communication of the application control information in the single traffic flow over the wireless link.

17. The article of claim 16, wherein the application control information is communicated in a wireless control message over wireless signaling in assured mode.

18. The article of claim 17, wherein communicating the application control information and application data information comprises multiplexing the wireless control message containing the application control information with a flow of the application data information over a physical traffic channel.

19. The article of claim 18, wherein the physical traffic channel comprises a fundamental channel.

20. The article of claim 16, wherein the instructions when executed further cause the system to:
detect if the mobile station is in a first mode or a second mode;
in response to detecting the mobile station in the first mode, assigning a shared forward supplemental channel and one of a forward fundamental channel and forward dedicated control channel to the mobile station, the shared forward supplemental channel being shared by the mobile station and at least another mobile station; and
in response to detecting the mobile station in the second mode, assigning a forward fundamental channel without assigning a shared forward supplemental channel to the mobile station.

21. The article of claim 20, wherein the shared forward supplemental channel is shared by the mobile stations that are part of a press-to-talk group.

22. A mobile station comprising:
an interface to a wireless link for communication with a base station system;
a controller to:
communicate application control information and application data information in a single traffic flow over the wireless link to the base station system, wherein the traffic flow is not associated with a Radio Link Protocol (RLP) reliability mechanism over the wireless link, wherein the application control information and application data information are both related to a voice-over-Internet Protocol (IP) application, and
communicate the application control information in a wireless control message over wireless signaling associated with the traffic flow, the wireless signaling associated with an acknowledgment mechanism to provide assurance that the application control information has been successfully delivered.

23. The mobile station of claim 22, further comprising a multiplex sublayer to multiplex a flow of the application data information with the wireless control message carrying the application control information onto a physical traffic channel of the wireless link.

24. The mobile station of claim 22, wherein the wireless control message comprises one of a layer 2 and layer 3 wireless control message containing a block of bits, the block of bits containing the application control information.

25. The mobile station of claim 24, wherein the application control information comprises control information associated with a press-to-talk (PTT) application, and the application data information comprises voice data associated with the PTT application.

26. The mobile station of claim 22, further comprising a header removal layer to remove protocol headers from packets carrying the application data information prior to transmitting the application data information in the traffic flow over the wireless link.

27. The mobile station of claim 26, wherein the header removal layer is adapted to remove Internet Protocol (IP) headers from packets.

28. The article of claim 16, wherein using the wireless signaling acknowledgment procedure comprises using the wireless signaling acknowledgment procedure that provides acknowledgment of an L2 or L3 wireless control message containing the application control information.

29. The mobile station of claim 22, wherein the acknowledgment mechanism provides an acknowledgment of an L2 or L3 control message containing the application control information.

* * * * *